UNITED STATES PATENT OFFICE.

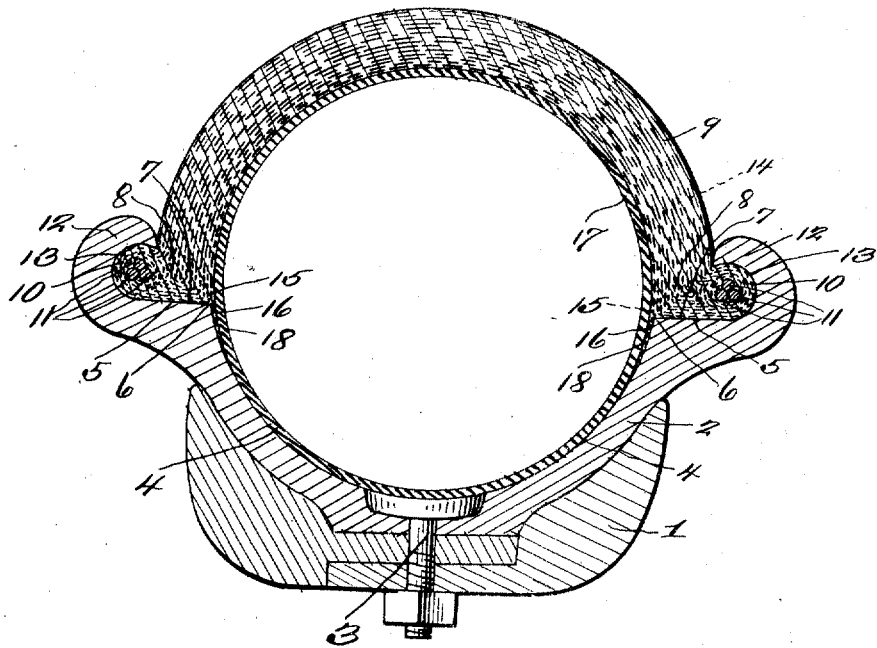

HARRY RICHARD LORENZ AND HENRY WILLIAM OJENDYK, OF ASHTON, NEBRASKA.

COMBINED RIM AND CASING.

1,253,988.  Specification of Letters Patent.  Patented Jan. 15, 1918.

Application filed June 30, 1914.  Serial No. 848,294.

*To all whom it may concern:*

Be it known that we, HARRY RICHARD LORENZ and HENRY WILLIAM OJENDYK, citizens of the United States, residing at Ashton, in the county of Sherman and State of Nebraska, have invented a new and useful Combined Rim and Casing; and we do hereby declare the following to be a full, clear, and exact description of the invention, such as will enable others skilled in the art to which it appertains to make and use the same.

This invention relates to a new and useful tire casing for automobile wheels.

As an object of the invention it is the aim to provide a casing comprising an auxiliary steel rim substantially semi-circular in cross section and the outer rubber casing semi-circular in cross section, between which and the auxiliary steel rim the inner pneumatic tube is designed to be arranged, there being clench connections between the rim and the rubber casing.

Another object of the invention is that the steel rim serves as one half of the casing, thus doing away with the weakest part of the present casings, and further overcoming the wear on the casing caused by the rough roads at the widest point on the tire, which in this case would fall upon the beads of the auxiliary steel rim.

A further object of the invention is that the present casing overcomes all rim cuts and weakness of the casing.

A further object of the invention is the provision of an auxiliary steel rim substantially semi-circular in cross section and of sufficient depth to receive the rubber section of the casing when the same becomes punctured, thereby protecting the rubber section of the casing against damage and entirely protecting the same from the weight of the car, which in the present case would fall upon the clench connecting beads.

Another object of the invention is that by constructing a casing of two sections substantially semi-circular in cross section, one half of the material now used for the rubber tires is eliminated, thus producing cheaper tires.

In practical fields the details of construction may necessitate alterations, falling within the scope of what is claimed.

The invention comprises further features and combination of parts, as hereinafter set forth, shown in the drawings and claimed.

In the drawings, there is illustrated a single cross sectional view of the improved tire or casing constructed in accordance with the invention.

Referring more especially to the drawing, 1 designates the dominant rim of the wheel, to which the auxiliary rim 2, substantially semi-circular in cross section, is bolted as shown at 3. The inner semi-circular cavity 4 of the steel rim 2 is smooth and unobstructed, and where this semi-circular cavity connects and terminates with the horizontal bearing surfaces 5 an angular corner 6 is provided. Engaging the flat horizontal bearing surfaces 5 are the flat horizontal surfaces 7 of the feet portions 8 of the rubber casing 9 semi-circular in cross section. The feet portions are provided with laterally extending beads 10, each having embedded therein a plurality of wire rods 11, affording rigidity and stability for the beads. The side portions of the steel rim 2 terminate in hollow overhanging beads 12 which overlie and engage the beads 10 of the rubber casing 9, thereby holding the two sections of the casing securely together and the surfaces 5 and 7 firmly in contact. The horizontal bearing surfaces 5 merge into the hollow inner surfaces 13 of the beads 12, thereby providing a close fit with the surfaces 7 and the beads 10. The rubber casing 9 consists of a composition of canvas and rubber consisting of a plurality of layers 14, the inner layer 15 having an inner unobstructed surface and terminating in flanges 16, overlying the joint between the surfaces 5 and 7, thereby preventing the inner tube 17 from being pinched. The flanges 16 bevel off toward the inner surface 4 of the steel rim 2, as indicated at 18.

The provision of the flanges 16 filling the excessive width or space between the outer surface of the inner pneumatic tube and the inner surface of the auxiliary rim 2, prevents the opposite sides of the casing 9 from bulging outwardly and laterally, when pressure is applied upon the casing 9. In other words, the inflating of the inner tube 17, causes said inner tube to bear against said flanges 16, and clamp them securely in place, thereby preventing said bulges. It will be observed that a casing constructed as set forth and shown in the drawing provides an absolutely smooth inner surface for the inner pneumatic tube. An advantage to be derived by extending the flanges 16 only partially between the inner tube and said rim involves the easy removal of the tire casing. For instance when the inner tube is deflated, the diametrically opposite portions of the casing may be crushed, after which the casing may be removed by stretching the same over the clencher flanges and at the same time the flanges 16 will easily pull from between the inner tube and the rim. Should the flanges 16 extend under the inner tube and overlap each other, the inner tube when crushed laterally would tend to bind them against each other, and prevent the casing from being removed. In case the section 9 of the casing and the pneumatic tube becomes punctured, then the section 9 of the casing may be received in the cavity 4 of the auxiliary steel rim, in which case the beads 12 are of sufficient strength to support the weight of the vehicle.

The invention having been set forth, what is claimed as new and useful is:—

In combination, a wheel rim, the body of which in cross section having its greater portion circular, and its outer diametrically opposite sides constructed on arcs of greater radii than the circular body portion, said diametric opposite increased arcs merging into said circular body portion, said rim having opposite clencher flanges and diametrically opposite cylindrical ledges adjoining said clencher flanges and being concentric with the center of the wheel, said ledges being substantially at right angles to and extending in opposite directions from said arcs of greater curvature thereby forming abrupt sharp diametrically opposite shoulders, an inner tube engaging said rim, a tire casing semi-circular in cross section having its diametrically opposite portions provided with cylindrical ledges concentric with the center of the wheel and engaging the first ledges and provided with beads to be engaged by the clencher flanges, the inner portions of the last named ledges having thin circular flanges tapering radially and fitting between the inner tube and the diametrically opposite increased curved arcs of the rim, whereby the opposite sides of the casing are prevented from bulging upwardly, outwardly and laterally.

In testimony whereof we have signed our names to this specification in the presence of two subscribing witnesses.

HARRY RICHARD LORENZ.
HENRY WILLIAM OJENDYK.

Witnesses:
JAMES F. FAIRFIELD,
GEORGE L. POLSKI.